P. FREYBURGER.
KNEADING MACHINE.

No. 180,568. Patented Aug. 1, 1876.

Witnesses:

UNITED STATES PATENT OFFICE.

PAUL FREYBURGER, OF STUTTGART, GERMANY.

IMPROVEMENT IN KNEADING-MACHINES.

Specification forming part of Letters Patent No. 180,568, dated August 1, 1876; application filed April 11, 1876.

*To all whom it may concern:*

Be it known that I, PAUL FREYBURGER, of Stuttgart, in the Empire of Germany, engineer, have invented Improvements in Machines for Kneading and Mixing Various Substances or Materials, of which the following is a specification:

This invention consists in the combination of a trough having its bottom formed in two half-cylinders, with two elliptical disks or blades, placed obliquely in relation to their axis, revolving in the said trough, and describing by their outer edges two parallel cylinders corresponding with the two half-cylinders of which the bottom of the trough consists, which revolving disks or blades are caused to operate as kneading shovels or mixers on the material supplied to the trough.

Figure 1:
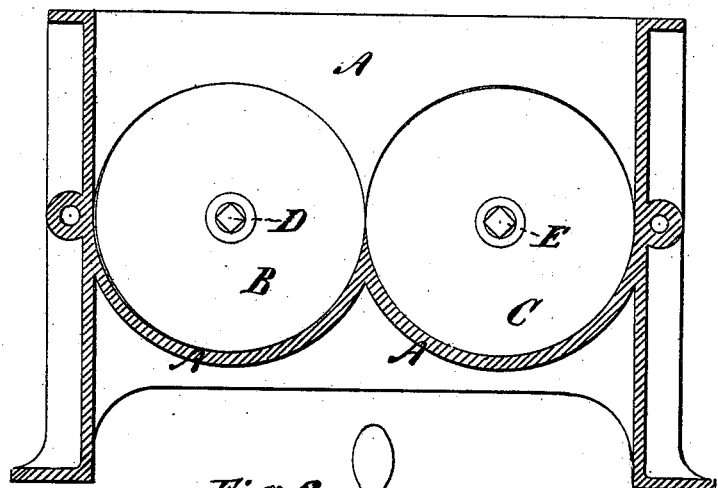
Figure 2:
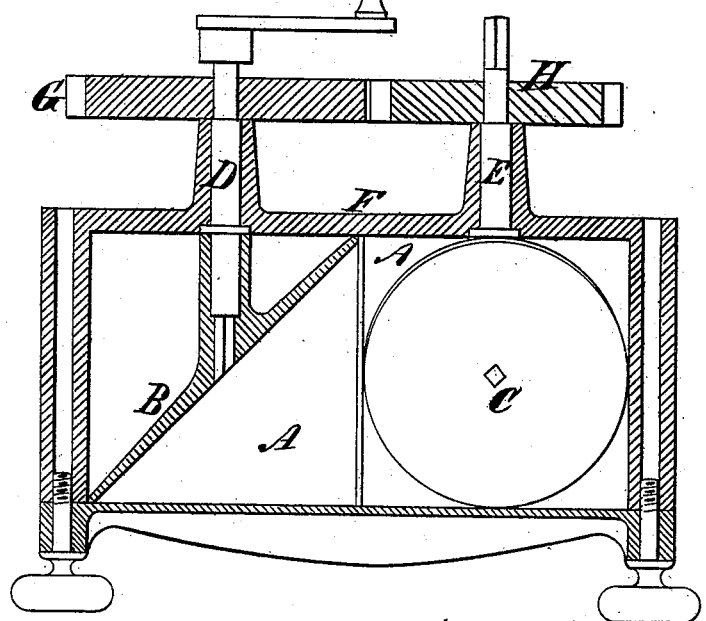

In the drawing, Figure 1 is a vertical section, and Fig. 2 is a horizontal section, of the machine.

A is the trough. B and C are the disks or blades, which are fixed obliquely on the ends of shafts D and E, extending through one of the walls or sides F of the trough, and driven as required by toothed gear G H or other suitable means arranged outside the trough. These elliptical blades or disks B and C, by revolving, have their flat cutting or dividing edges caused to approach and recede in such a manner as to cut, divide, disintegrate, stir, mix, throw, squeeze, and knead the material dropped onto them from the open top of the trough. The disks or blades B and C can be driven at any required speed, and varied in their relative speeds, in order to suit the nature of the material intended to be operated upon. This can be effected by adapting the driving-gear, as required. The wall or side of the trough opposite to that through which the axles of the disks or blades B and C are passed, is made so as to be removable, in order to admit of the finished material being withdrawn from the trough, as required. The disks, blades, or shovels B and C are also, in most cases, fitted to their axles in such a manner that they can be removed therefrom with facility, in order to be cleaned, as required.

The machine above described can be used for kneading, mixing, disintegrating, and beating dough or other materials and ingredients.

The drawing represents the machine in the simplest form, adapted only for such small sizes as do not require powerful driving-gear. In some cases, also, the front or movable cover is, or may be, constructed differently from the mode represented in the drawing—for instance, simple double doors, furnished with hinges similar to fire-doors, may be used for the purpose.

I claim as my invention—

The combination of a trough, A, having a bottom formed as described, with two elliptical disks, blades, or shovels, B and C, fitted and acting substantially in the manner described.

PAUL FREYBURGER.

Witnesses:
E. BOECKLEN, *Engineer.*
W. DIETRICH,
*Repetent at the Royal Polytechnic.*